E. H. Branson,
Wood Planing Machine.
Nº 10,246.     Patented Nov. 15, 1853.
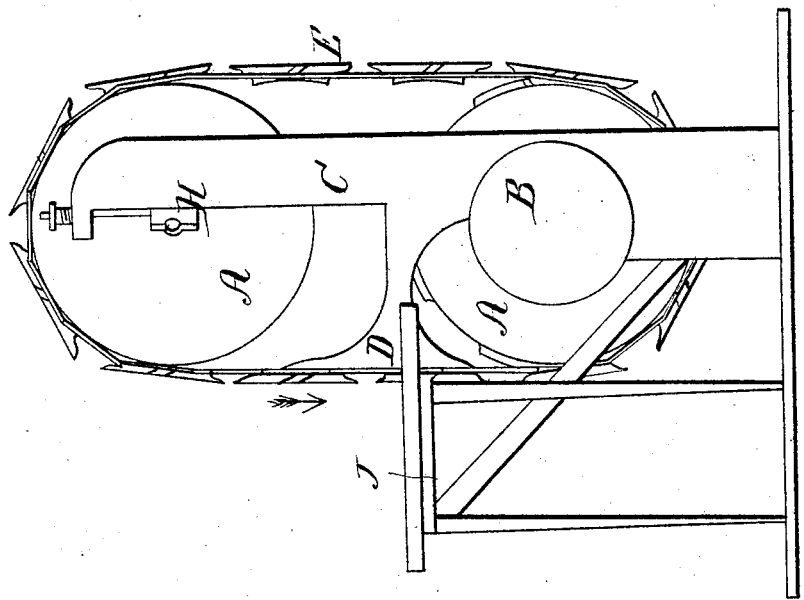
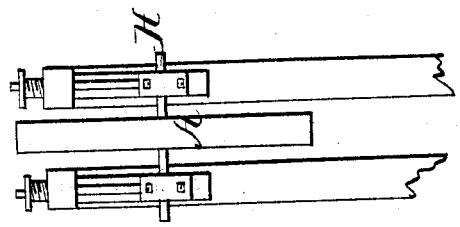

UNITED STATES PATENT OFFICE.

EVAN H. BRANSON, OF FREDERICKSBURG, VIRGINIA, ASSIGNOR TO FRANKLIN SLAUGHTER.

MACHINE FOR DRESSING CROOKED TIMBER.

Specification of Letters Patent No. 10,246, dated November 15, 1853.

*To all whom it may concern:*

Be it known that I, EVAN H. BRANSON, of Fredericksburg, in the county of Spottsylvania, State of Virginia, have invented a new and Improved Mode of Planing Crooked Timber; and I do hereby declare that the following is a full and perfect description thereof, reference being had to the accompanying drawings and to the letters of reference marked thereon.

The nature of my invention consists in supporting the arbor of one of two pulleys, carrying an endless belt of knives, upon elastic bearings, arranged and operated as set forth.

To enable others in the art to make and use my invention I will proceed to describe its construction and operation.

A A two pulleys the lower one driven by a belt passing over the outside pulley B attached to the same shaft, the upper pulley A being a guide for the belt of planes the same being on the rod H and acting upon a spiral spring in such manner as to obviate strain. The planes forming the belt E arched on the under side in such manner as to fit the pulleys A A and confined together by straight bars of metal with loose joints so as to bend at any required angle and become a straight line at the slide D at which point they pass through the timber held upon the table F, the table F resting upon loose joints so that the outer edge may be raised to plane any required bevel. The planes are half round on the face in order to plane circular or any desired shape. The bits are made bevel in such manner as to cut smooth across the grain of the timber. The slide D to be made in such manner as that the planes pass through the straight bars of metal, only running on the slide.

Having thus fully described the nature of my invention what I claim therein as new and desire to secure by Letters Patent, is—

Supporting the arbor of one of two pulleys carrying an endless belt of knives for dressing crooked timber upon elastic bearings, for the purpose of yielding to any undue strain upon the knives substantially as described.

EVAN H. BRANSON.

Witnesses:
GEO. W. EASTHAM,
JNO. W. COLLINS.